(12) United States Patent
Nuss et al.

(10) Patent No.: US 9,753,936 B1
(45) Date of Patent: Sep. 5, 2017

(54) METERING DATA IN DISTRIBUTED STORAGE ENVIRONMENTS

(71) Applicant: Amazon Technologies, Inc., Seattle, WA (US)

(72) Inventors: Michael Anthony Nuss, Boston, MA (US); Matti Juhani Oikarinen, Wilmington, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 305 days.

(21) Appl. No.: 14/557,114

(22) Filed: Dec. 1, 2014

(51) Int. Cl.
*G06F 17/30* (2006.01)

(52) U.S. Cl.
CPC .. *G06F 17/30144* (2013.01); *G06F 17/30138* (2013.01); *G06F 17/30156* (2013.01); *G06F 17/30203* (2013.01)

(58) Field of Classification Search
CPC ........ G06F 17/30575; G06F 17/30082; G06F 17/30091; G06F 17/30194; G06F 17/30313; G06F 17/30371; G06F 11/1464; G06F 11/1451; G06F 3/061; G06F 3/0659; G06F 17/30144; G06F 17/30156; G06F 17/30203; G06F 17/3013; G05F 17/30011; G05F 3/0671; H04L 67/1097; H04L 63/102
See application file for complete search history.

(56) References Cited

U.S. PATENT DOCUMENTS

| | | | | |
|---|---|---|---|---|
| 7,647,329 | B1 * | 1/2010 | Fischman | G06F 17/30094 707/999.1 |
| 7,716,180 | B2 * | 5/2010 | Vermeulen | G06F 17/30212 707/626 |
| 8,812,450 | B1 * | 8/2014 | Kesavan | G06F 3/0689 707/656 |
| 9,632,882 | B2 * | 4/2017 | Kumarasamy | G06F 11/1489 709/217 |
| 2002/0120763 | A1 * | 8/2002 | Miloushev | G06F 17/30197 709/230 |
| 2003/0093541 | A1 * | 5/2003 | Lolayekar | H04L 67/1097 709/230 |
| 2005/0036387 | A1 * | 2/2005 | Seal | G01D 9/005 365/222 |
| 2008/0010212 | A1 * | 1/2008 | Moore | G01D 3/08 705/63 |
| 2012/0011207 | A1 * | 1/2012 | Morris | H04L 12/58 709/206 |
| 2012/0278382 | A1 * | 11/2012 | Faith | G06F 3/064 709/203 |

(Continued)

*Primary Examiner* — Anh Ly
(74) *Attorney, Agent, or Firm* — Davis Wright Tremaine LLP

(57) ABSTRACT

Techniques described and suggested include systems, methods, and processes for determining data-related attributes, such as size, for data and/or data containers (such as volumes and file systems) resident on distributed storage systems. For example, a shared records storage device may be utilized to gather information related to file systems stored on a distributed storage system having a plurality of storage servers. A data processor may be used to generate information records and meter data storage size for file systems resident on the distributed storage system, and such records may be provided to requestors, such as customers associated with the file systems.

20 Claims, 8 Drawing Sheets

(56) References Cited

U.S. PATENT DOCUMENTS

| | | | |
|---|---|---|---|
| 2012/0330903 A1* | 12/2012 | Periyagaram | G06F 3/0608 |
| | | | 707/692 |
| 2013/0325804 A1* | 12/2013 | Bachar | G06F 17/3012 |
| | | | 707/634 |
| 2014/0046900 A1* | 2/2014 | Kumarasamy | G06F 17/30575 |
| | | | 707/620 |
| 2016/0162187 A1* | 6/2016 | Lee | G06F 12/0246 |
| | | | 711/103 |

* cited by examiner

METERING DATA IN DISTRIBUTED STORAGE ENVIRONMENTS

BACKGROUND

As computing power becomes increasingly decentralized in the name of efficiency and scalability, data storage capabilities are also moving to a distributed, decentralized model in which storage servers or other devices are allocated in such a way as to replicate a given chunk of data across multiple such servers or devices so as to increase durability, scalability, performance, and the like. Due to the increasingly massive nature of such distributed data storage systems, tracking consumption of services provided therefrom becomes increasingly complex. For example, in distributed storage systems, as a result of time lag when distributing or replicating data across multiple storage devices, the storage devices may store a different quantity, content, or version of the data at a given point in time, and accurately obtaining various types of information related to the data (such as the quantity thereof) may be difficult. As greater numbers of customers utilize distributed data storage systems in an ever-increasing slate of applications, efficient methods for metering data stored thereon to, for example, correctly charge the appropriate customer for usage thereof, become important.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include systems, methods, and processes for determining data-related attributes, such as size, for data and/or data containers (such as volumes and file systems) resident on distributed storage systems. For example, in embodiments where extents are replicated across a plurality of storage devices of a distributed storage system, individual file systems in a given extent may thus also be replicated across the plurality of storage devices. In some of such embodiments, various attributes of such file systems, such as the amount of data effectively or actually consumed by each file system, may be determined using the techniques described.

For example, each storage device storing a replicated extent or derivative thereof (e.g., in a system where data is sharded across multiple servers or devices to improve performance, durability, and availability) may iterate through all elements (e.g., file systems) contained within an extent to generate a manifest or report containing information related to each file system, such as the size of each file system. In this example, each storage device sends the generated report to a shared records storage device, such as a volume or bucket of a distributed storage device or service, and the validity of each report for at a given time is determined based on, for example, the staleness of the report, consistency with reports from other storage devices reporting on the same file system or extent, and the like. The valid reports are, in some embodiments, processed by a data processor to generate records for each file system identified in all reports for the extent, and, in some embodiments, are combined with prior-generated reports (e.g., those generated from reports for one or more prior slices of time) to generate derivative or combined attributes attributable to each file system, such as an effective or actual size of the file system on the device. In some embodiments, these derivative or combined attributes, e.g., through the generated records, are either made available to requestors (e.g., through an application programming interface (API)), or are pushed to various systems that would benefit from knowledge of such derivative or combined attributes (e.g., a billing system, in the case of size on disk of a given file system). In some of such embodiments, the derivative or combined attributes are rewritten to the storage devices themselves for ease of future access (e.g., in the superblock of a given file system).

Figure 1:
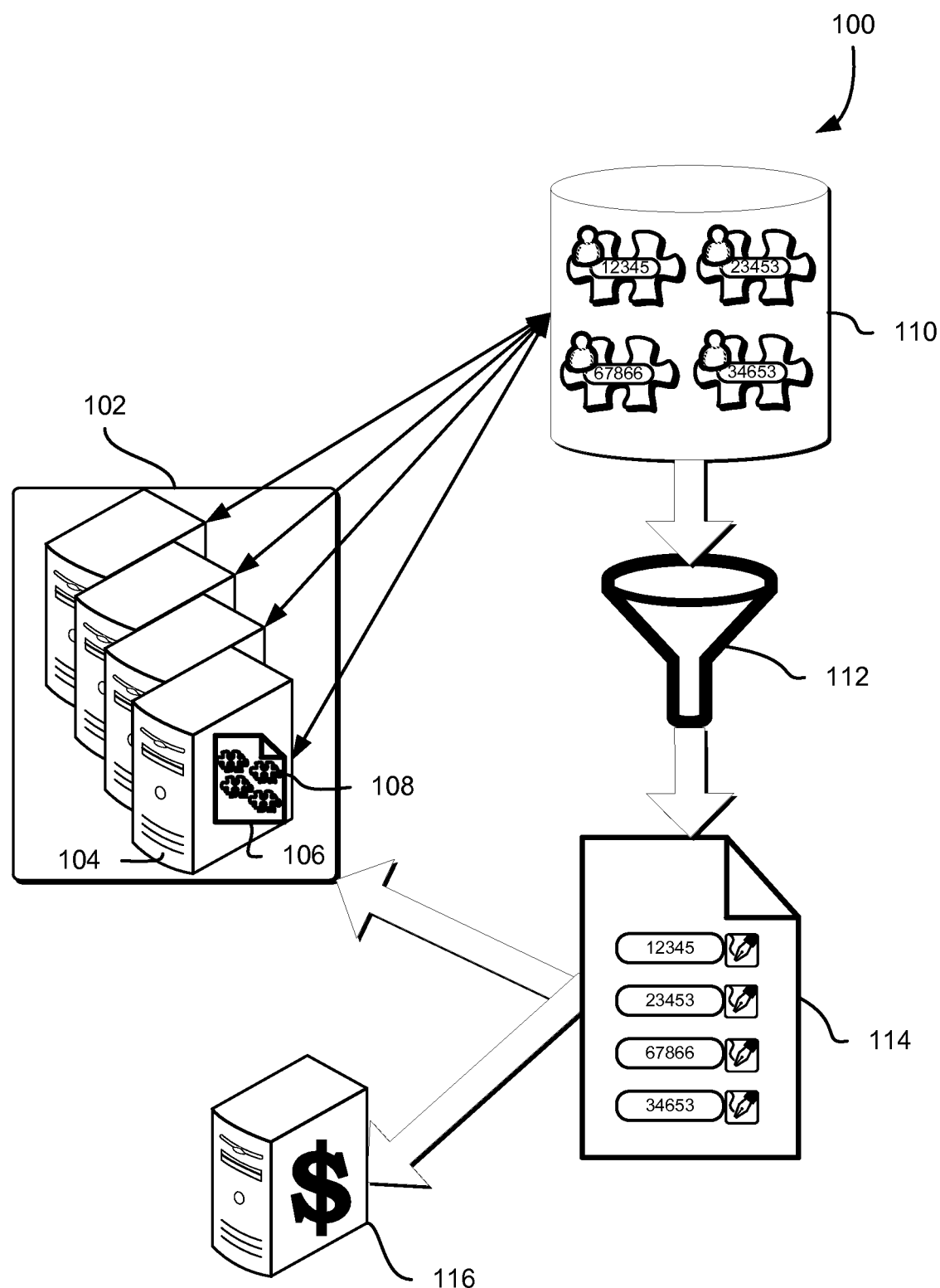
FIG. 1 schematically illustrates a workflow for metering data resident on a distributed storage system in accordance with some embodiments.

FIG. 1 illustrates a workflow for metering data resident on a distributed storage system in accordance with some embodiments. FIG. 1 illustrates a workflow 100 for metering data resident on a distributed storage system 102 in accordance with some embodiments. Distributed storage system 102 may include one or more storage servers or storage devices 104, each of which is capable of having one or more extents 106 allocated thereon. The distributed storage system 102 may be implemented by a computing resource service provider that, upon request, allocates hardware resources to virtual computing systems, which are programmatically manageable by the requestor. As contemplated herein, a requestor may be any entity capable of requesting and programmatically managing a requested resource. For example, a requestor may be a computing device (either physical or virtual) that may submit requests (e.g., in an automated fashion). As another example, a requestor may be a component of a customer computer system (whether physical or virtual) which, in some embodiments, is responsive to the interaction of the customer. It is contemplated that while a customer/provider relationship is discussed herein for illustrative purposes, the techniques described are applicable to other relationships amongst and between computing entities, such as enterprise environments, business intelligence systems (such as those using automated computing entities to determine metrics related to data stored to other systems connected therewith).

Extents 106 may include an allocation of one or more blocks of the storage device so as to provide a uniform device mapping at an abstraction level higher than that of the storage device itself. For example, extents may be a contiguous set of disk blocks allocated for a given data container, and may be defined in a manner appropriate to the implementation. For example, an extent may be defined by an identifier as well as the start point and end points or length (e.g., block address, offset, etc.) of the address range allocated on the storage device. Allocated extents 106 may provide secondary mappings to, for example, enable computing entities to address data locations within the extent without needing to define the physical location of such data on the disk. Such extents 106 may be replicated on a plurality of storage servers 104 so as to improve durability, availability, and/or access performance of data stored thereon.

For example, durability may be improved by implementing mirroring, redundancy coding, and other techniques for ensuring that a failure of a number of storage servers will not destroy the data replicated thereon. Availability may be improved by, for example, parallelizing access to data stored on multiple storage servers such that temporary or permanent disablement of a subset of the storage servers does not interrupt access to the data replicated thereon. Replication may improve access performance by, for example, increasing parallelism or load capacity such that access latency is decreased, input/output throughput (e.g., number of IOPS) is increased, and/or steady state bandwidth (e.g., sequential read and write performance) is increased. Therefore, replication may have multiple benefits, and may be implemented using any appropriate method to improve some or all of the abovementioned parameters. As previously described, such methods may including mirroring, redundancy coding, and the like.

Each extent 106 is capable of including one or more file systems 108, or portions of file systems. In embodiments where extents 106 include portions of file systems, in some of such embodiments, the extents 106 may respectively track only the portions of file systems in that respective extent, and may not necessarily have information regarding other portions of the file systems represented or contained in other extents. For example, if a given extent has portion A of file system X and portion A of file system Y, it may only track the portion A of file system X and portion A of file system Y, rather than either portion B of file system X or portion B of file system Y, which may be stored elsewhere (e.g., tracked by a different extent). However, while the present disclosure focuses on file systems, inclusion of any container abstraction capable of being stored within an allocation of block storage (such as an extent 106) is contemplated herein. For example, extents may also include volumes, files or any other level of abstraction of data storable within a block device or an allocated set of blocks.

In some embodiments, each storage server 104 of the distributed storage system 102 iterates through each extent 106 allocated thereon. The storage server 104 may iterate through each extent to determine and/or catalog file systems or other data abstractions 108 stored within the extent, and may send information related to the file systems/data abstractions to a shared record storage device 110. The shared record storage device 110 may be a physical and/or virtual device of, for example, the distributed storage system 102, or in some embodiments, may be a device that is separate from the distributed storage system 102. In some embodiments the shared record storage device 110 may be a relational database or other data store. The information sent from the storage servers 104 to the shared record storage device 110 may include an identification of each file system 108 by, for example, association of a unique identifier for each file system, the estimated size on disk or other measure of data quantity, the identification of an entity or customer to which the file system belongs, permissions lists for all or part of the file system, the file system type (e.g. NTFS, FAT, ext4, ReiserFS, ZFS, F2FS, NFS, etc.), and/or any other relevant characteristics related to the file system.

The information stored within shared records storage device 110 is modeled and/or filtered using a data processor 112 to generate one or more records 114 relating to the contents of each extent 106. The records 114 may include all, or a subset of, the information sent from the storage servers 104 as described above. For example, the record may, for a given file system, include some or all of the estimated size on disk or other measure of data quantity, the identification of an entity or customer to which the file system belongs, permissions lists for all or part of the file system, the file system type (e.g. NTFS, FAT, ext4, ReiserFS, ZFS, F2FS, NFS, etc.), and/or any other relevant characteristics related to the file system, as derived from the information sent from the storage servers 104. In some embodiments, the data processor 112 may be a component associated with distributed storage system 102. In some embodiments, the data processor 112 may be a processing engine implemented using for example, a computing device or computing instance of a larger distributed computing system, such as the systems of a computing resource service provider. The records 114 generated therefrom may, for example, be keyed by a file system identifier (which may be unique), as previously discussed. In the case that multiple entries for a given extent 106 exist, e.g., in the case that a given extent 106 is replicated, duplicates may be processed out by periodically overwriting records related to that extent 106 within shared records storage device 110 such that when valid information is deemed to have been received for a given extent 106, no further information relating to that extent 106 received from other storage servers 104 relating to the same extent 106 will be recorded. Other techniques for handling duplicative information may, for example, using the data processor 112 to remove duplicates prior to generating the records 114.

The records 114 are, in some embodiments, combined with records generated at a previous time (e.g., on a per file system basis) and may be sorted or otherwise ordered by the associated file system identifier. In such embodiments, combined or derivative attributes may be determined based on the outcome of such combinations. For example, an average size of a file system over time may be determined based on combining records from a given iteration of workflow 100 and one or more prior-run iterations of workflow 100. Such averages may include decaying averages, approximations of decaying averages, and generally, computations of statistical values where the length of the time lapsed since a given measurement was taken correlates positively with the effect on the calculated value assigned are contemplated herein. Such combined, normalized, or otherwise derivative information relating to each file system 108 is, in some embodiments, concatenated into one or more finalized records and may be provided to third party services 116. Such third party services may include billing systems, monitoring systems, and the like. In certain embodiments, finalized records are provided back to distributed storage system 102 to, for example, be stored or otherwise associated with the file systems 108 or extents 106 to which the finalized records pertain. For example, the distributed storage system 102 may be capable of storing an average or determined file system size in a designated area of an extent 106 for each file system contained therein. Subsequent runs of workflow 100 may, for example, update information relating to the size of one or more file systems associated with each extent 106, and thus would be updated at an interval or schedule dictated by the schedule on which workflow 100 is performed.

Figure 2:
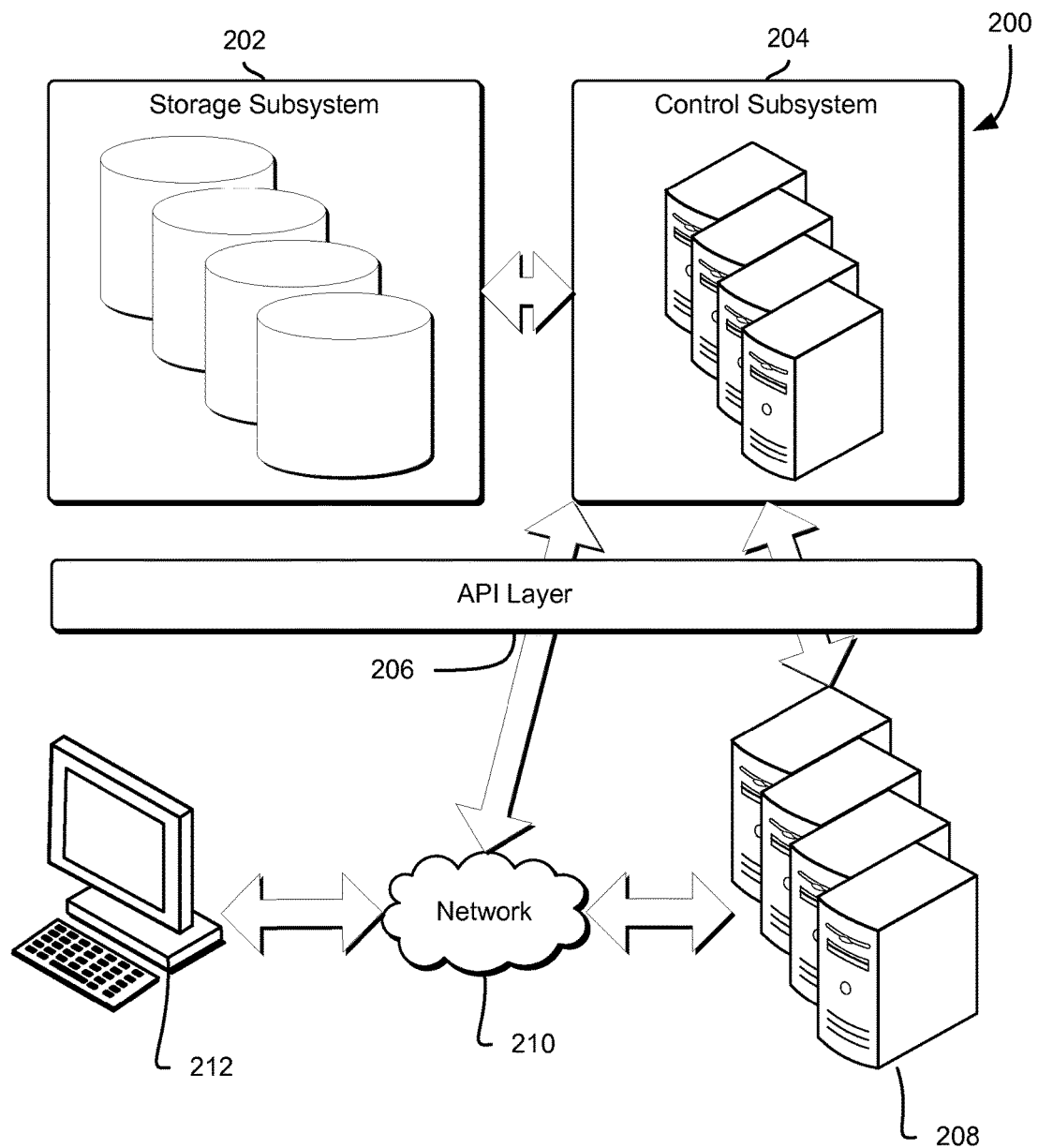
FIG. 2 illustrates an example environment in which data metering techniques may be implemented in accordance with some embodiments.

FIG. 2 illustrates an example environment 200 in which data metering techniques may be implemented in accordance with some embodiments. A storage subsystem 202 is operatively connected to or otherwise associated with a control system 204. In some embodiments, the storage subsystem 202 and control subsystem 204 comprise the functional components of, for example, distributed storage system 102 described above in connection with FIG. 2. In some embodiments, storage subsystem 202 includes a plurality of storage servers, such as storage servers 104 described above in connection with FIG. 1. However, it is contemplated that the storage subsystem 202 may comprise of other types of physical storage devices, such as, for example, stand-alone network attached storage devices, virtualized storage devices of a distributed storage system, hard disk drives, solid state drives, and the like. Such devices are under control of the control subsystem 204 which, in some embodiments, provides some or all of the scheduling and processing capabilities and techniques described above in connection with FIG. 1 and elsewhere herein. Various types of computing devices, physical, virtual or both (such as may be the case for devices of a computing resource service provider), may be used to implement control subsystem 204 and therefore, the techniques described herein.

In some embodiments, the storage subsystem 202 is capable of physically storing data upon one or more storage devices. For example, extents are allocated upon the storage subsystem 202 and file systems, data elements and the like are stored within the extents. As previously discussed, such data may be replicated across a plurality of storage servers of the storage subsystem 202, such as by using redundancy coding and other techniques. The control subsystem 204 may interact with storage subsystem 202 to, for example, allocate extents, implement various replication techniques, and apportion data to the various components of the storage subsystem 202 for storage. In some embodiments, the control subsystem 204 provides an interface, such as an API through API layer 206, for end points (e.g., customer device 212) to commit and obtain data stored on the storage subsystem 202.

In some embodiments, control subsystem 204 communicates with a distributed storage service 208 through, for example, an application programming interface (API) layer 206. The API layer 206 may expose various functionality associated with control subsystem 204 through, for example, the network 210 to customers or customer devices 212. The API layer 206 may be a set of servers that receive API calls over a network, such as the Internet, an intranet, or the like. For example, the servers may be computing entities of a computing resource provider, and may be homogenous or heterogenous in nature (e.g., physical, virtual, or some combination thereof). Such API calls may be configured for processing in a multitenant environment, e.g., with parameters identifying a customer (e.g., of a computing resource service provider), authentication information (e.g., the customer's digital signature), specific data or metrics requested, and the like. In some embodiments, the control subsystem 204 provides some or all of the filtering and record generating capabilities described in connection with FIG. 1, such as the functionality of data processor 112, the scheduling and/or sequencing of reporting from each individual storage server 104 relating to extents 106 and/or file systems 108 stored thereon, determination of derivative or combined information flowing into and from finalized records 114, and so forth.

The distributed storage service 208 may provide the functionality of shared records storage device 110. In some embodiments the API layer 206 provides an interface for processed information, such as that flowing from finalized records 114 to third-party services 116, distributed storage system 102 and the like. Accordingly, as shown in FIG. 2, control subsystem 204 may provide functionality directly to requesting customer devices 212 or to internal requesters, such as storage service 208. In some embodiments, storage service 208 is a secondary storage service separate from the distributed storage system 102. It is contemplated that other requesters may interact with control subsystem 204, such as various aspects of a distributed computing service (such as that provided by a computing resource service provider), third-party services and the like. Although the storage service 208 is illustrated and described herein as communicating with the control subsystem 204 through the API layer 206, it is contemplated that in some embodiments, the storage service 208 may interact directly with the control subsystem 204 without an interceding API layer 206. In some of such embodiments, the storage service 208 may itself communicate with, e.g., customers or customer devices 212 through the API layer 206 in a similar fashion to that described above.

Figure 3:
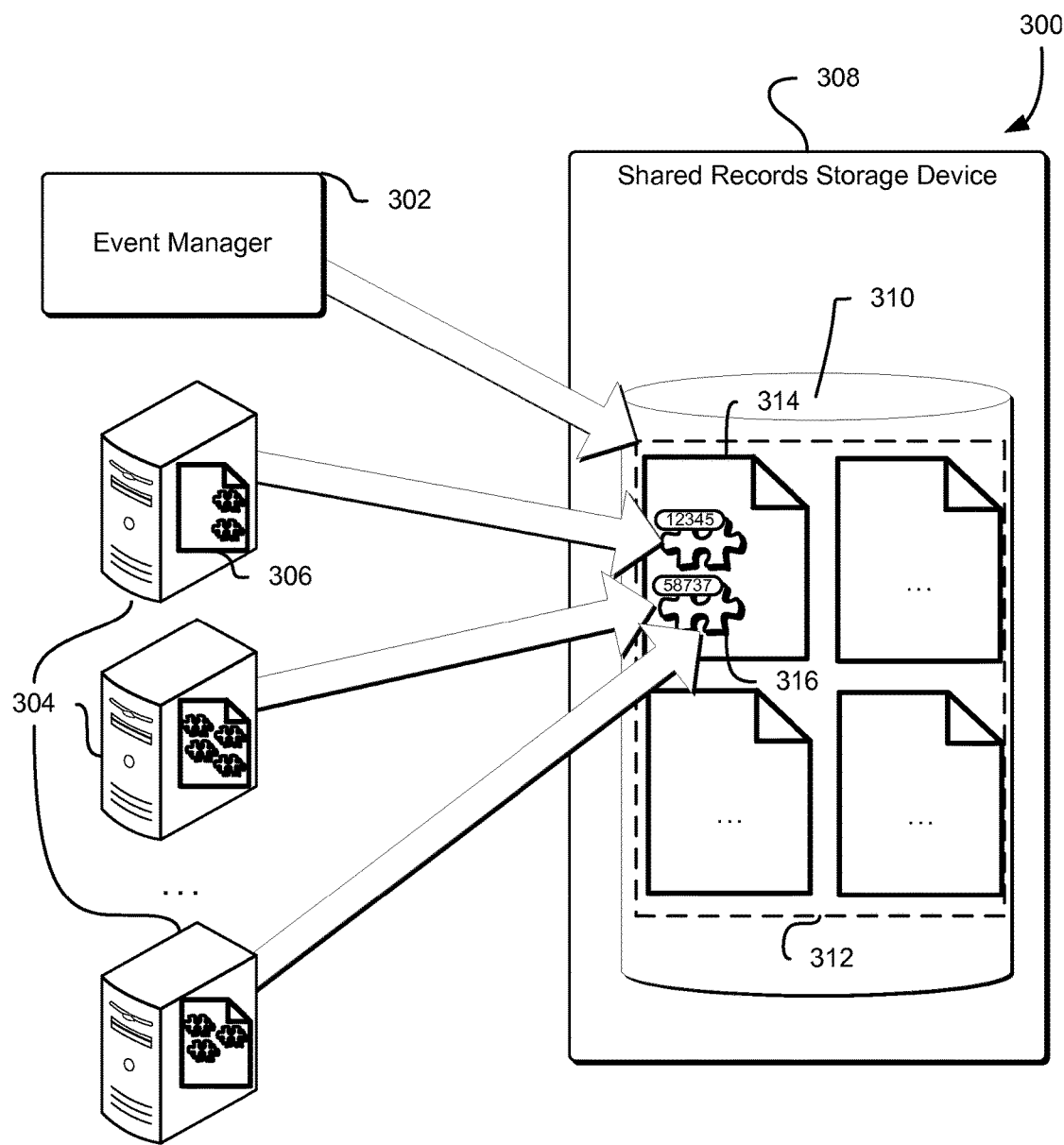
FIG. 3 illustrates example techniques for processing data-related information for data replicated across a plurality of servers, in accordance with some embodiments.

FIG. 3 illustrates example techniques for processing data-related information for data replicated across a plurality of servers, in accordance with some embodiments. In some embodiments, event manager 302 tracks the allocation of extents on a distributed storage system such as the distributed storage system 102 described in connection with FIG. 1 above. Such an event manager 302 may detect when extents are newly allocated on the distributed storage system. The event manager may be a part of the distributed storage system or, in some embodiments, may be implemented separately from the distributed storage system such as on a computing device (e.g., physical or virtual) of a computing resource service provider. Storage servers 304, which may be substantially similar in functionality to storage servers 104 described above in connection with FIG. 1, have allocated thereon, or are capable of having allocated thereon, extents 306 which in turn are capable of storing data such as file systems, each of which in turn may belong to one or more of a plurality of entities connecting thereto. Such entities may, for example, include customers of a distributed storage system or of a computing resource service provider. In some embodiments, event manager 302 and storage servers 304 submit information regarding extents allocated on the distributed storage system to a shared records storage device 308. Such a shared records storage device may be a physical or virtual storage device that, in some embodiments, may be a part of distributed storage system.

In some embodiments, the shared records storage device may be a storage device that is implemented separately from a distributed storage server, such as a device provisioned from a storage service (such as the storage service 208 described above in connection with FIG. 2). For example, the shared records storage device may be an instance (virtual or physical) or allocation of a second distributed storage system or storage service separate from, e.g., distributed storage system 102, hosting the extents and file systems. The shared records storage device 308 may contain one or more data stores 310. Such data stores 310 may in some embodiments include databases, distributed storage devices, computing instances, virtual computing systems, physical computing entities or any appropriate virtual or physical device capable of storing information in a keyed or indexed format. The data store 310 may have one or more records repositories 312, which in turn are capable of storing a plurality of records 314. Each record 314, in some embodiments, corresponds to information related to a given extent allocated on the sum of the storage servers 304. It is contemplated that when a given extent 306 is replicated on a plurality of storage servers 304, a single record 314 may be generated and maintained for that extent 306 regardless of the number of replications stored on storage servers 304.

Each record 314 contains information related to data attributes 316 of individual elements of data (e.g., file systems) stored within the extent represented by the record 314. In some embodiments such data attributes are keyed to a unique identifier for each data attribute. In some embodiments, a unique identifier for a data element may be a file system identifier if the data element is a file system. For each given unique identifier, other data attributes associated with the data element may be stored within the record 316 and keyed to the unique identifier. For example, in the case where the data element is a file system, a unique identifier may be the file system's unique identifier. The attendant record may include attributes such as the allocated actual and/or effective size on disk of the file system, a customer entity or computer system identification, and the like. All of such information may be associated within the record to the file system identifier.

In some embodiments, event manager 302 may send information, either continuously or on a periodic basis, related to some or all extents allocated on a distributed storage system (such as a distributed storage system including storage servers 304) to shared records storage device 308 so as to generate an overall manifest of records to be stored within data store 310. In some embodiments, the event manager may only send such information at a time either coincident with or after an extent is newly allocated on a distributed storage system or storage servers 304. However, it is contemplated that data attributes represented in the record 314 may include any information related to the data element stored or allocated within extent 306, such as permissions lists, file type, file system type, customer identification and the like.

In some embodiments, storage servers 304 may each iterate through all extents allocated thereon to provide information related to such extents as well as the data elements within to data store 310. In some embodiments, a process may be configured to operate continuously, periodically or in some other fashion to provide information related to extent 306. For example, iterative processes may be run on an hourly basis so as to update records 314 with changes to allocated extents 306 within the hour prior to when the process is run. As previously mentioned, in some embodiments, each unique extent may be associated with a single record 314 and each unique data element 316 may be indexed to a unique identifier within record 314.

Also as previously discussed, in embodiments where a given extent is replicated across a plurality of storage servers 304, duplicative or incorrect information related to a given extent, such as that which may be sent from multiple storage servers 304 replicating the extent, may be culled, combined or otherwise processed by an entity associated with a shared records storage device so as to retain authority of a single record 314 for a given extent 306. Such culling or processing may in some embodiments be performed in any appropriate manner. For example, for an extent 306 stored on a plurality of storage servers and when storage servers 304 submit information related to that extent on a periodic basis such as on an hourly basis subsequent reports from storage servers 304 storing that extent 306 may be ignored upon receipt and detection of a valid report within the period for that extent 306. Alternatively, all reports for a given extent received from plurality of storage servers 304 may be combined or averaged in such a way as to generate a blended record for the replicated extent 306. These examples are not intended to be limiting, and other methods and procedures for preserving a "one record, one extent" or a "one record, one data element" policy are contemplated herein.

Figure 4:
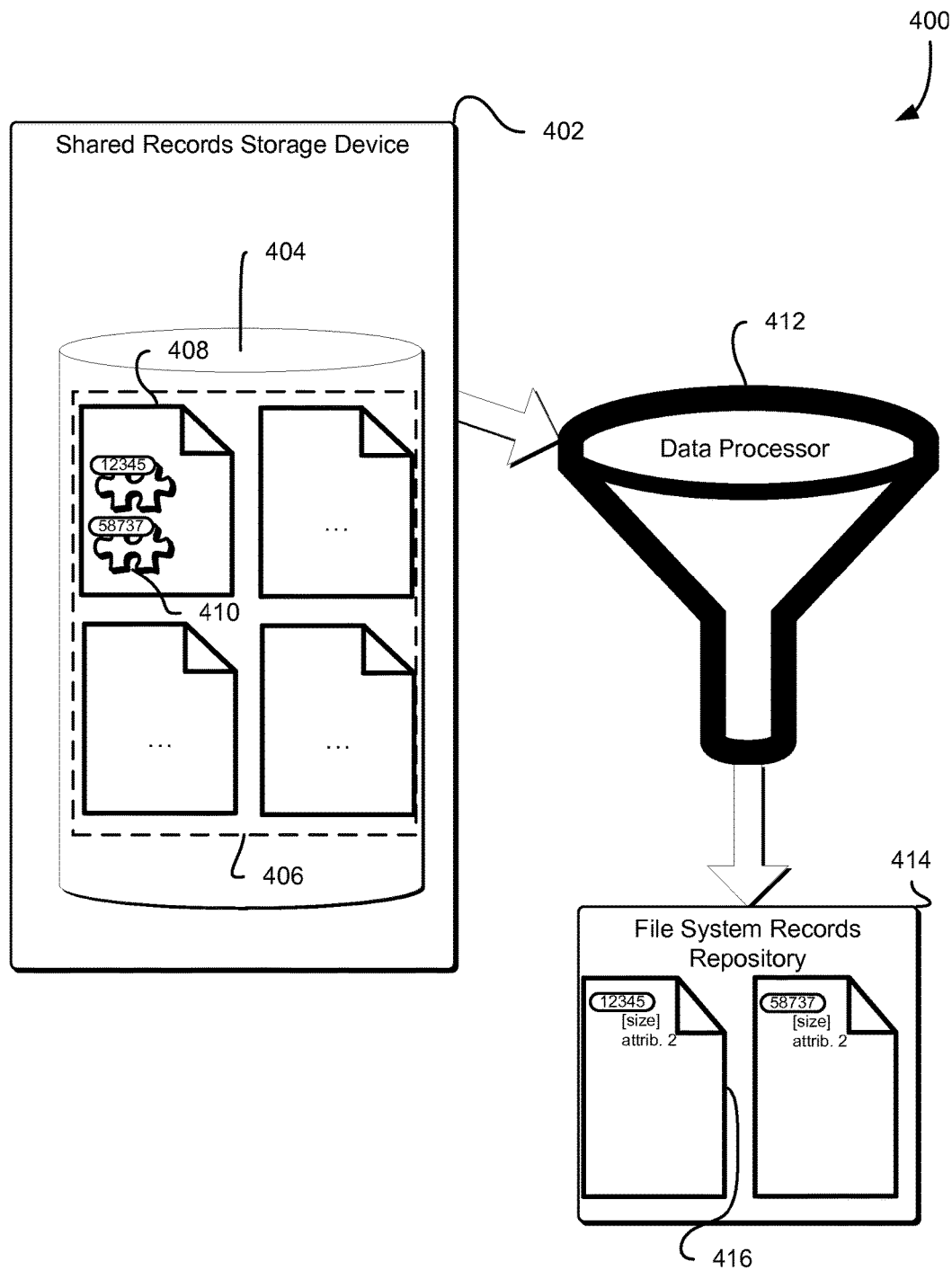
FIG. 4 schematically illustrates a workflow for processing data-related manifests or other records in accordance with some embodiments.

FIG. 4 schematically illustrates a workflow for processing data-related manifests or other records in accordance with some embodiments. A shared records storage device 402 may, in some embodiments, include a data store 404 having allocated or partitioned thereon one or more records repositories 406, which in turn are capable of storing records 408 associated with extents or other abstractions of block allocations on a distributed storage system. The shared records storage device 402, the data store 404, the records repository 406, and the records 408 may, in some embodiments, be similar in functionality or implementation to the shared records storage device 308, the data store 310, the records repository 312, and/or the records 314 described in connection with FIG. 3 above. Additionally, various components and techniques described in connection with FIG. 4 may be implemented on one or more of the storage system 202, control system 204, or the storage service 208. Data element entries 410 are, in some embodiments, be similar to the entries for data element 316 described in connection with FIG. 3 above. Some or all records 408 are pushed, pulled, or otherwise obtained by data processor 412. The data processor 412 outputs, to file systems records repository 414, one or more sets of finalized records 416. In some embodiments, finalized records 416 are correlated, on a one to one basis, with file systems or other data elements stored across the storage servers (e.g. storage servers 104, 304) of the distributed storage system 102. File system records repository 414 may be a repository within data store 404, or may be located in a different system (such as a separate device or service provided by a computing resource service provider).

In some embodiments, the data processor 412 may be implemented using resources of the distributed storage system or, in some embodiments, may be implemented separately from the distributed storage system such as on a computing device (e.g., physical or virtual) of a computing resource service provider. In some embodiments, the data processor 412 is capable of processing enterprise-level quantities of data in parallel, such as by implementing a distributed processing framework, such as MapReduce.

In some embodiments, data processor 412 may process the records 408 to filter, sort, and summarize the records 408 within records repository 406 to generate finalized records 416. In some embodiments, the data processor 412 may process the records 408 by using an implementation of a distributed processing framework, such as MapReduce so as to parallelize and most efficiently process a large number of data elements, such as that which may be stored across a plurality of storage servers of a distributed storage system.

In some embodiments, the data processor 412 may generate a unique identifier based on the time stamp at which a given processing action has started, as well as the time period to which it applies. The identifier may be unique relative to the file system (or other data element) in combination with the time stamp. For example, an identifier for a given file system may be different at one time than the identifier generated for the same file system at a different time. Similarly, in some embodiments, a generated identifier at a given time may be different as between differing file systems.

Thereafter, the data processor may read or otherwise obtain a current list of presently allocated extents on distributed storage system 304, for example, such as from the information generated by event manager 302 described in connection with FIG. 3 above. Such information may be used to determine which extents should exist for the time period at which the job is being processed and may, in some embodiments, exclude the entries within records repository 406 for records associated with extents that were created at a time after the presently processed job. In some embodiments, some or all relevant extent records 408 may be combined on a per-data element basis, prior to processing by the data processor 412. For example, for a given file system where portions of the file system exist on a plurality of extents, the extent records 408 for each extent harboring a portion of the file system may be combined, such as by the data processor 412, or by another entity. Determination of which extent records 408 need to be combined may be dependent on the data elements present, and such determination may be performed by, e.g., the data processor 412.

Thereafter, the data processor 412 may generate a manifest of intermediate entries identifying all valid records for extent records 408 to be finally processed by data processor 412. Such manifests may identify key value pairs identifying the specific unique data attribute identifier as well as the specific version of record 408 to be finally processed by data processor 412. Finally, in such embodiments, one or more applicable techniques, such as an implementation of a distributed processing framework such as MapReduce as described above, is used to synthesize the key value pairs in the generated manifest and generate finalized records 416 for each file system.

Such finalized records 416 may capture, on a per data element basis, all previously captured attributes associated with that data element. For example, a file system record may include information regarding its normalized size, a customer to which it is associated, a last updated date, and so forth. However, it is contemplated that finalized records 416 may include only a subset of the previously captured attributes. The scope of the subset may be attuned to the implementation. For example, if only data metering capabilities related to storage size are required, a file system record may only include an identifier of the file system and size-related metrics. Additionally, other data elements, such as volumes, virtual storage devices, and the like, capable of being stored within an extent, are contemplated hereby. As discussed above, file systems records repository 414 may be generated and persisted by any appropriate entity capable of storing and persisting records, such as the shared records storage device 402, the data store 404, and the records repository 406.

Figure 5:
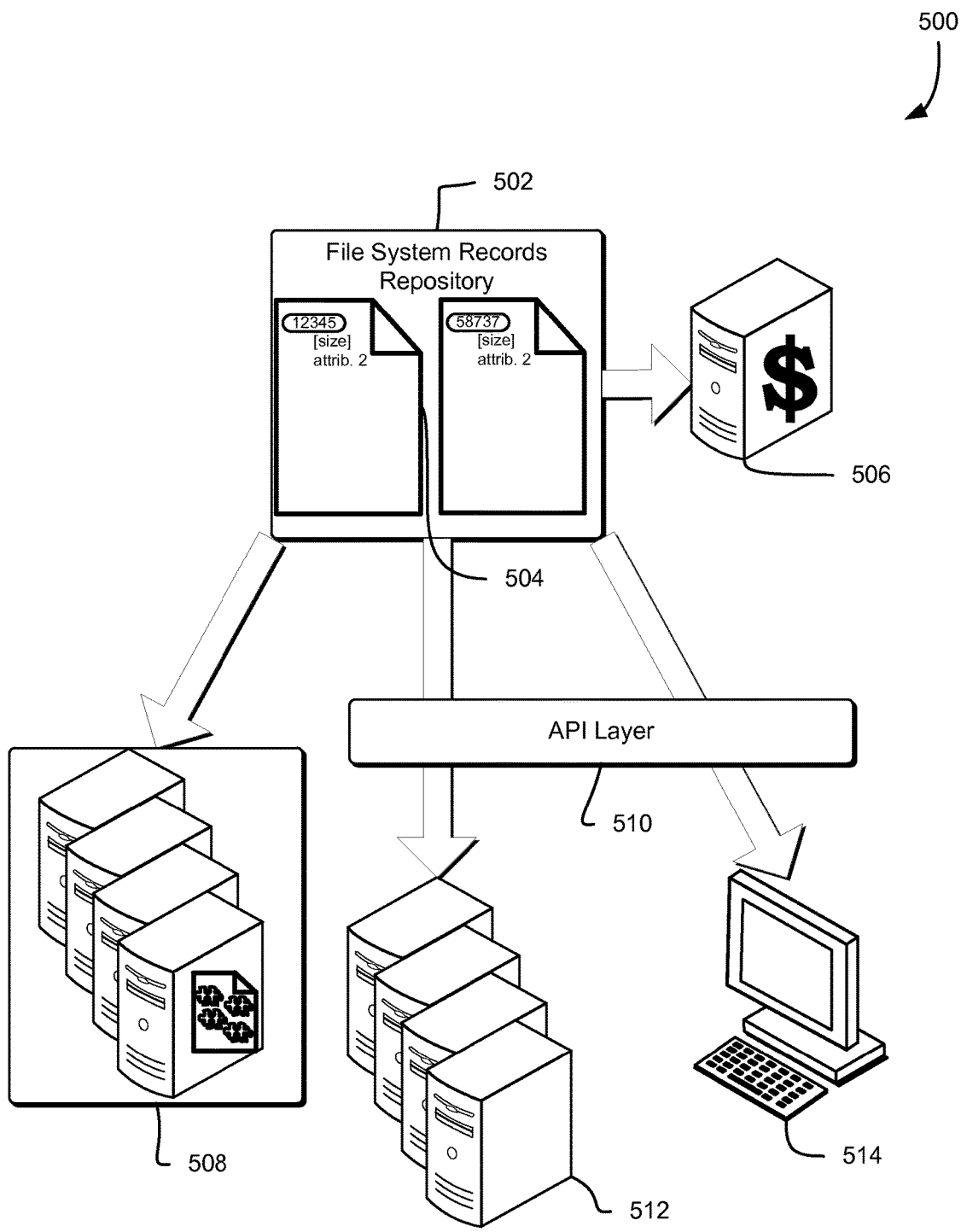
FIG. 5 illustrates various workflows applicable to file system records repositories in accordance with some embodiments.

FIG. 5 illustrates various workflows applicable to file system records repositories in accordance with some embodiments. File system records repository 502 receives and persists finalized records 504 in accordance with the techniques described. In some embodiments, the file system records repository 502 and finalized records 504 may be similar in implementation to file system records repository 414 and finalized records 416 described above in connection with FIG. 4. After generation in accordance with the techniques described, the finalized records 504 may be made available to one of a number of entities or requestors. For example, finalized records 504 may be pushed or otherwise made available to an accounting or billing system 506 to, for example, allow the billing system to appropriately bill a customer for the amount of disk space effectively allocated to a given data element such as a file system. In some embodiments, the finalized records are provided so as to be granular enough to bill various subunits associated with a given customer, such as business units, functional groups, arbitrarily defined billing units, and the like.

Finalized records 504 may be made available through an application programming interface (API) layer 510, which allows direct programmatic interaction between, for example, the file system records repository 502 and a requestor or entity. Through the API layer 510, a computing entity 512 (such as a computing entity of a computing resource service provider) or a customer endpoint 514 may access one or more finalized records 504 from, for example, the file system records repository 502. It is contemplated that the API layer 510 may also be utilized for internal programmatic interactions such as with the aforedescribed billing systems 506. In some embodiments, rather than providing finalized records 504 on request, the file system records repository 502 may push the finalized records 504 to the various entities described herein, without necessitating a request from such entities.

In some embodiments, the finalized records 504 are provided to the distributed storage system 508 upon which the extents and data elements described in the finalized records 504 reside. For example, such finalized records 504 and the attributes associated with a given data element described in the record may be provided such that the determined attributes are written directly to or otherwise associated with the data elements or the allocated extent to which they apply. In some embodiments, the calculated size on disk for a given file system, as stored in finalized record 504, may be provided to distributed storage system 508 to be written directly to a superblock or other data header or allocation table for (or associated with) the file system. Such a feedback loop would provide, for example, systems interacting directly with the data that the distributed storage system 508 current information regarding the data elements stored therein without the need to query the file system records repository 502 for such information.

Figure 6:
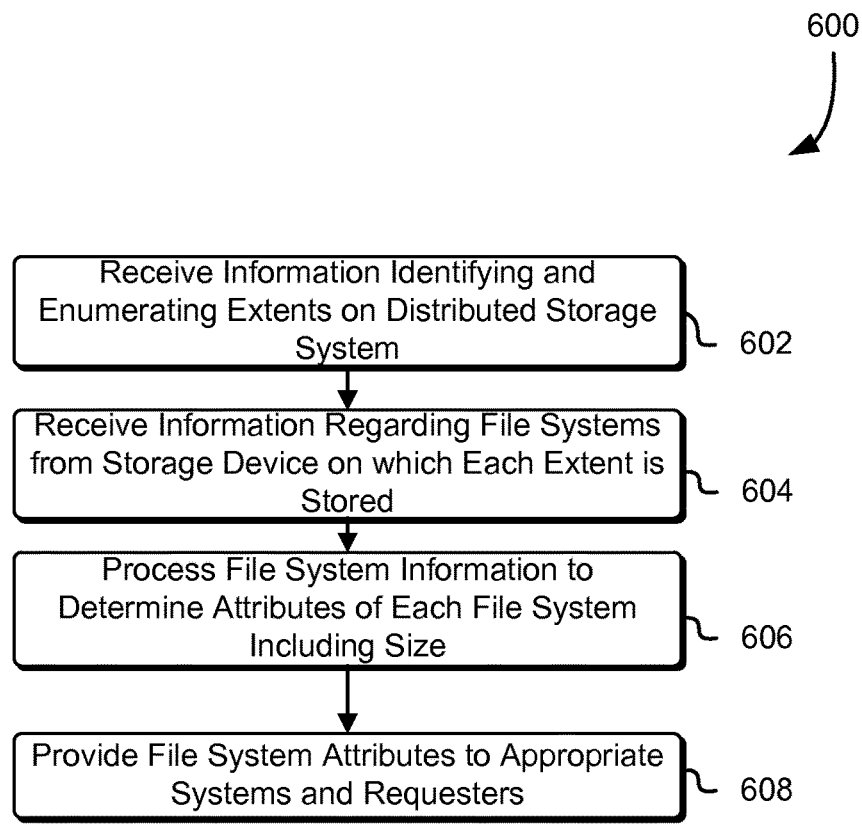
FIG. 6 illustrates an example process for generating, processing, and providing attributes related to data resident on a distributed storage system, in accordance with some embodiments.

FIG. 6 illustrates an example process for generating, processing, and providing attributes related to data resident on a distributed storage system, in accordance with some embodiments. At step 602 an entity, such as a distributed storage system or other system of a computing resource service provider, implementing the techniques described herein receives information identifying and enumerating extents allocated on a distributed storage system. The distributed storage system may be a distributed storage system such as that described in connection with FIGS. 1-3 and 5.

At step 604, the entity receives information regarding data elements, such as file systems, from the storage device or server (such as the storage servers described above) on which each allocated extent is stored. Thereafter, at step 606 the received data element or file system information is processed, e.g., by a data processor as previously described, to determine, normalize and/or sort attributes associated with each data element or file system. Such attributes, as previously discussed may include an effective size of a given file system. Thereafter at step 608, processed and finalized records including the data element information or file system information processed in step 606 are made available to appropriate systems and/or requesters. As previously discussed, such provision may occur through a data pushed to various systems, and, in some embodiments, may be made available to requestors, such as through an API.

Figure 7:
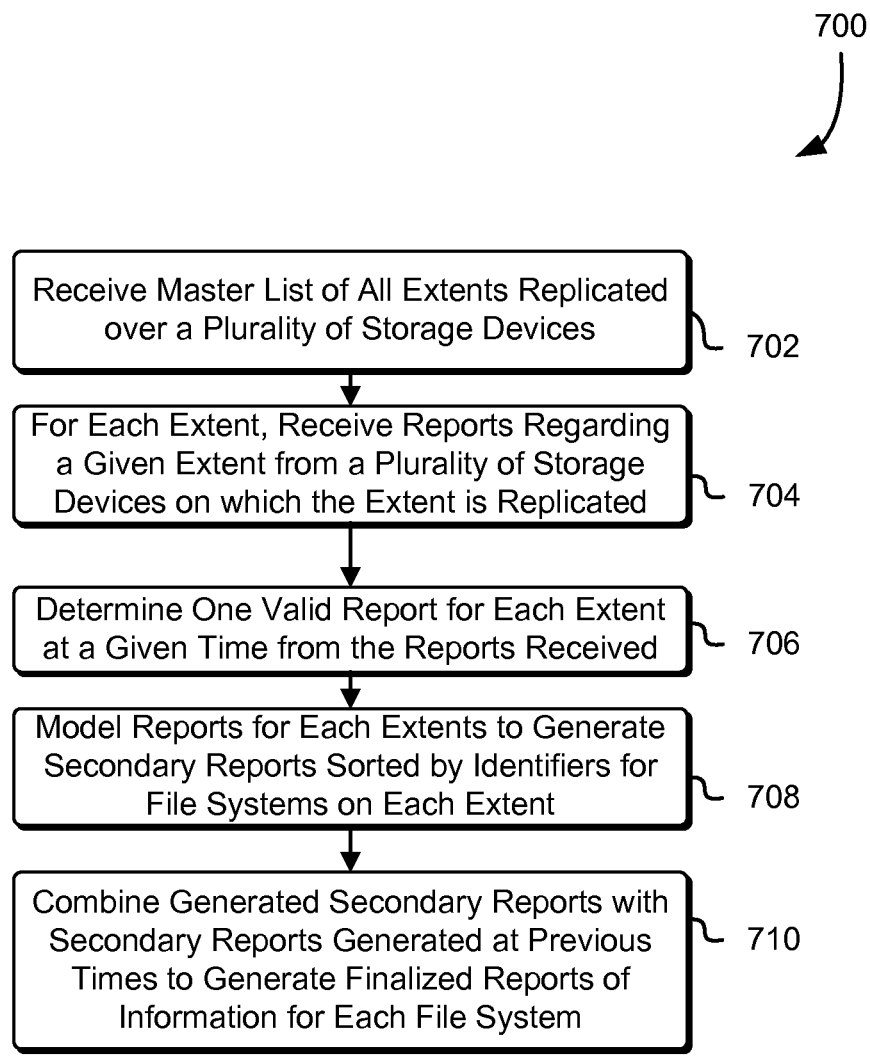
FIG. 7 illustrates an example process for processing and modeling finalized records in accordance with some embodiments.

FIG. 7 illustrates an example process 700 for processing and modeling finalized records in accordance with some embodiments. At step 702 a master list of extents replicated on a distributed storage system, such as the distributed storage system 102 described in connection with at least FIG. 1, is received. As previously discussed, a given extent may be replicated across multiple storage servers or devices within the distributed storage system and may contain substantially similar versions of data elements across each replicated version of the extent. In some embodiments, as previously discussed, the list of extents received may be incremental. For example, the list received at a given time may only include new extents or modified allocations thereof since a previous receipt of the list. In some embodiments, a complete list of extents presently extant on the system is received, and in certain embodiments, the content and/or completeness of the list may be dynamically determined based on operational or environmental parameters (such as the number of extents created exceeding a predetermined value, a new storage server being added to the system, as part of a routine housekeeping check, and the like). At step 704, each storage device generates information, such as reports regarding a given replicated extent, and provides them to, for example, a data processor such as the data processor 412 described above in connection with FIG. 4. Such information may, as previously described, include various attributes associated with file systems or other data elements contained within the extent. The attributes may include, for example, attributes the allocated actual and/or effective size on disk of the file system, a customer entity or computer system identification, and the like.

At step 706 the data processor determines at least one valid report for each unique extent allocated on the distributed storage system at a given time from the replicated reports received. Such processing may occur in a similar fashion as that described in connection with at least FIG. 4. For example, the data processor may omit further reports for file systems contained within a replicated extent once a valid report for that extent is received and determined to accurately reflect the contents of the extent. However, other methods for determining the validity of the reports are contemplated hereby, such as the methods described in connection with at least FIGS. 1 through 4. At step 708, reports for each extent, including the data elements described within the extent, are modeled so as to generate secondary reports, which are keyed to or sorted by an identifier unique to each data element within each extent. Such secondary reports may in some embodiments be similar to the finalized records 504 generated by data processor 412 and stored on a per data element or file system basis in file system records repository 502, similarly to described above in connection with FIGS. 4 and 5.

At step 710, secondary reports may be summarized into a summary report, or in some embodiments combined with previously generated reports to generate a report containing consistent or normalized information relating to each data element for a given time. Such combination, normalization, and summarization may occur in a fashion similar to that previously discussed in connection with FIG. 5 and FIG. 6, such as by using an implementation of a distributed processing framework such as MapReduce. The secondary reports generated and modeled in connection with steps 708 and 710 may thereafter be provided to appropriate systems and requesters, in accordance with various techniques described in connection with at least FIG. 6. As previously discussed, such systems may include billing systems, customer endpoints, storage systems (such as the distributed storage system housing the data), and the like. Also as previously discussed, the secondary reports may be provided upon request through an API layer such as the API layer 206 discussed in connection with FIG. 2 above. In some embodiments, the secondary reports are pushed to their destination (e.g., third party services) without the need for an attendant request.

Figure 8:
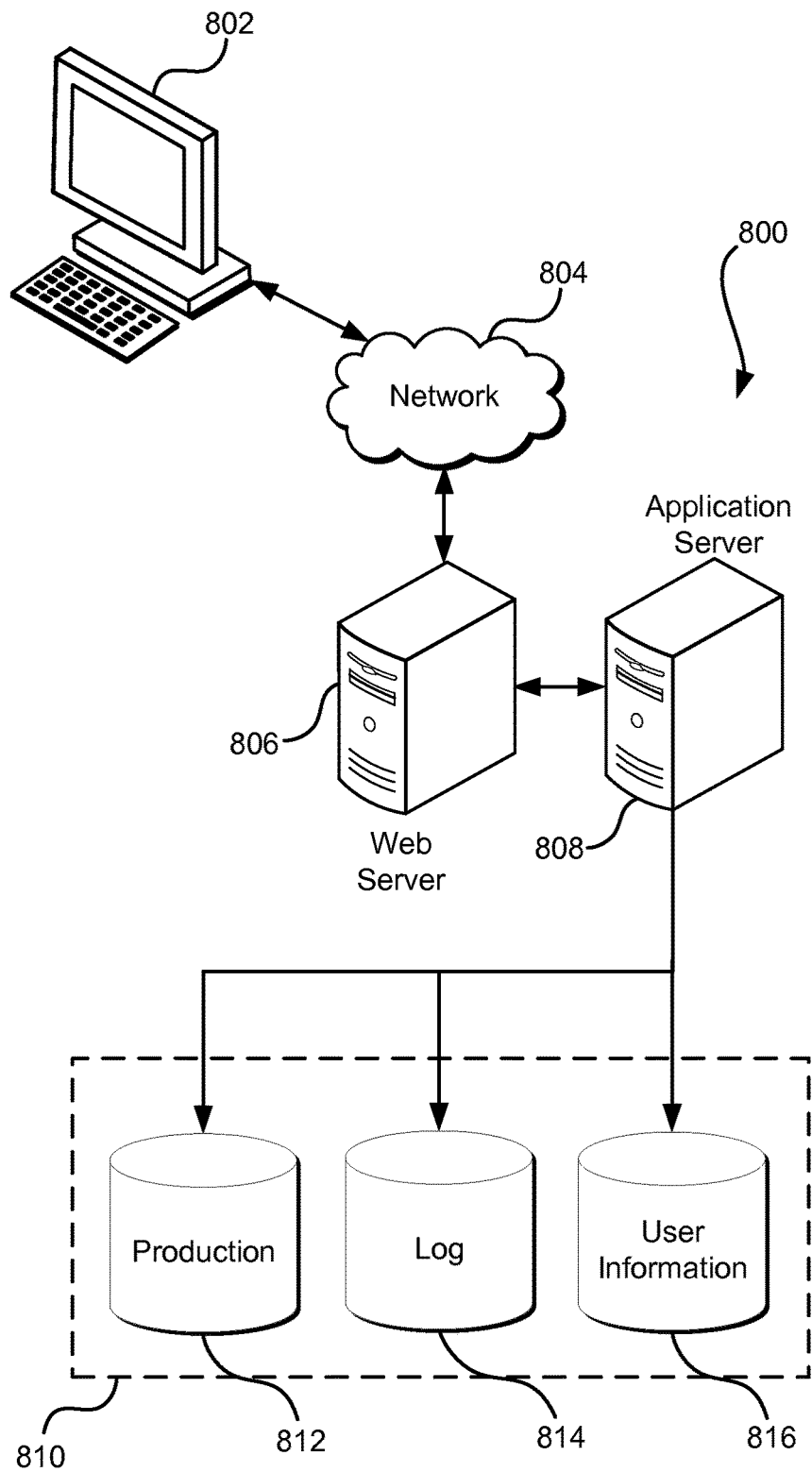
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes an application server 808 and a data store 810. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other applications may be generated by server-side structured languages as described or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
   under the control of one or more computer systems configured with executable instructions,
     determining a manifest of one or more extents replicated on a plurality of storage servers, each extent of the one or more extents allocating data storage space of the plurality of storage servers, the data storage space being capable of storing the data;
     for each extent of the one or more extents, determining file system information relating to file systems, at least portions of which are stored within the extent;
     processing the determined file system information by at least:
       sorting the file system information such that it is keyed, for each file system for which a portion is stored within at least one extent of the one or more extents in the manifest, to a plurality of file system identifiers within the information; and
       updating, for each of the plurality of file system identifiers, at least a subset of file system records by combining the sorted file system information for each of the one or more extents in which a respective portion of a respective file system is stored, such that the updated subset of file system records includes at least a size of the file system identified by the file system identifier; and
     for each extent of the one or more extents in the manifest, updating the file systems for which the portions are stored within the extent to include at least a subset of the processed file system information, the subset of the processed file system information including at least the size of each of the file systems.

2. The computer-implemented method of claim 1, wherein the determination of the file system information includes determining a valid report among a plurality of reports received from the plurality of storage servers upon which the extent is stored.

3. The computer-implemented method of claim 1, further comprising:
   for each extent of the one or more extents, providing, to one or more services, at least a subset of the processed file system information, the subset of the processed file system information including at least the size of each of the file systems.

4. The computer-implemented method of claim 3, wherein the one or more services includes a billing system.

5. A system, comprising:
   a plurality of storage devices;
   one or more processors;
   memory including instructions that, when executed by the one or more processors, cause the system to:
     determine one or more extent attributes for a plurality of extents allocated on at least a subset of the plurality of storage devices, the attributes including file system information for each file system within each extent of the plurality of extents;
     process the determined extent attributes for the plurality of storage devices to at least:
       sort the determined extent attributes based on the file system information; and
       determine size of each of the file systems by combining the sorted extent attributes with at least one set of prior records relating to the file systems.

6. The system of claim 5, wherein the instructions further cause the system to provide the processed extent attributes to a data system.

7. The system of claim 6, wherein the data system is a billing system.

8. The system of claim 6, wherein the data system is a system that interfaces with customers associated with at least a subset of the file systems.

9. The system of claim 6, wherein the data system is a distributed storage system that is operably connected to the plurality of storage devices.

10. The system of claim 9, wherein the instructions further cause the system to provide the determined size of each of the file systems to at least a subset of the plurality of storage devices so as to update each of the file systems with the determined size.

11. The system of claim 5, wherein at least some contents of the extents are replicated across at least two of the plurality of storage devices.

12. The system of claim 11, wherein the instructions further cause the system to discard redundant, stale, or inaccurate attributes prior to processing the determined extent attributes.

13. A non-transitory computer-readable storage medium having stored thereon executable instructions that, when executed by one or more processors of a computer system, cause the computer system to at least:
   generate, for at least two extents of a plurality of extents allocated on a plurality of storage devices, a first set of records for file system attributes relating to each of a plurality of file systems stored on the extents, the file system attributes including identifiers for each of the plurality of file systems;
   identify duplicate records from the first set of records;
   map the identified duplicate set of records to generate a second set of records that is sorted by the identifiers;
   combine the second set of records with at least one third set of historical records relating to each of the plurality of file systems to determine the size of each of the plurality of file systems, thereby generating a fourth set of records; and provide programmatic access to the fourth set of records.

14. The non-transitory computer-readable storage medium of claim 13, wherein the instructions further comprise instructions that, when executed by the one or more processors, cause the computer system to generate the first set of records on a distributed storage system that is separate from the computer system.

15. The non-transitory computer-readable storage medium of claim 13, wherein the computer system is operably connected to the plurality of storage devices.

16. The non-transitory computer-readable storage medium of claim 13, wherein each extent of the plurality of extents is durably replicated across at least a plural subset of the plurality of storage devices.

17. The non-transitory computer-readable storage medium of claim 13, wherein the instructions further comprise instructions that, when executed by the one or more processors, cause the computer system to, prior to generating the first set of records, enable each of the storage devices to report the file system attributes for each extent stored thereon.

18. The non-transitory computer-readable storage medium of claim 17, wherein the instructions further comprise instructions that, when executed by the one or more processors, cause the computer system to cull the duplicate records by selecting a recent valid report for an extent.

19. The non-transitory computer-readable storage medium of claim 13, wherein the instructions further comprise instructions that, when executed by the one or more processors, cause the computer system to provide programmatic access to the fourth set of records through one or more application programming interfaces (APIs).

20. The non-transitory computer-readable storage medium of claim 13, wherein the instructions further comprise instructions that, when executed by the one or more processors, cause the computer system to provide the fourth set of records to one or more services by pushing the fourth set of records to the one or more services.

* * * * *